(12) United States Patent
Entwistle

(10) Patent No.: US 7,027,599 B1
(45) Date of Patent: Apr. 11, 2006

(54) MEMORY DATABASE CREATION SYSTEM FOR ENCRYPTED PROGRAM MATERIAL

(75) Inventor: Paul Entwistle, Oxenhope (GB)

(73) Assignee: Pace Micro Technology Plc, Shipley (GB)

( * ) Notice: Subject to any disclaimer, the term of this patent is extended or adjusted under 35 U.S.C. 154(b) by 0 days.

(21) Appl. No.: 09/553,011

(22) Filed: Apr. 20, 2000

(30) Foreign Application Priority Data

Apr. 23, 1999 (GB) .................................. 9909362

(51) Int. Cl.
*G06F 7/00* (2006.01)

(52) U.S. Cl. ......................... 380/202; 380/202; 707/3; 707/6; 707/104.1; 382/103

(58) Field of Classification Search ................ 380/202; 707/3, 6, 104.1; 382/103
See application file for complete search history.

(56) References Cited

U.S. PATENT DOCUMENTS

| | | | | |
|---|---|---|---|---|
| 5,619,571 A | * | 4/1997 | Sandstrom et al. | 380/200 |
| 5,805,706 A | * | 9/1998 | Davis | 713/153 |
| 6,795,567 B1 | * | 9/2004 | Cham et al. | 382/103 |
| 2002/0083060 A1 | * | 6/2002 | Wang et al. | 707/10 |

FOREIGN PATENT DOCUMENTS

| | | |
|---|---|---|
| EP | 0 695 098 A2 | 1/1996 |
| EP | 0 715 241 A2 | 6/1996 |
| EP | 0 715 241 A3 | 6/1996 |
| EP | 0 676 756 A1 | 10/1996 |
| WO | WO 94/07332 | 3/1994 |
| WO | WO 94/30014 | 12/1994 |
| WO | WO 95/17059 | 6/1995 |

OTHER PUBLICATIONS

CVEPS—A Compressed Video Editing And Parsing System, Meng, J. et al, Nov. 18, 1996.

* cited by examiner

*Primary Examiner*—Ayaz Sheikh
*Assistant Examiner*—Taghi T. Arani
(74) *Attorney, Agent, or Firm*—Head, Johnson & Kachigian

(57) ABSTRACT

A memory database creation system for encrypted program material in which received encrypted material is first descrambled or decrypted and parsed to allow the generation of location identifiers for portions of the material. Once parsed, the location identifiers are stored in a database in a receiver and the material is again encrypted at the receiver prior to storage in memory. Typically, the steps of the method and system are performed at one instant thereby preventing unauthorized access to the material when it is in a descrambled or decrypted form.

6 Claims, 1 Drawing Sheet

MEMORY DATABASE CREATION SYSTEM FOR ENCRYPTED PROGRAM MATERIAL

CROSS-REFERENCE TO RELATED APPLICATIONS

This application claims priority to British Application No. 9909362.7 filed 23 Apr. 1999.

The invention which is the subject of this application relates to the ability to compile a database of information such as, but not exclusively, broadcast program material, in a memory and to the generation and provision of identification means to allow the retrieval of the material and to the ability to include a means for processing the material as it is received to allow the generation of the identification means prior to storage.

It is known in the transmission of broadcast material, which can be any or any combination of video and/or audio data and/or auxiliary data, that the data is received at a premises by a broadcast data receiver and that the received data can be decoded and stored in a hard disk drive or other form of random access memory for subsequent selective retrieval which may be provided integral with the receiver or connected thereto. However, with the ability to store the material in memory there is the accompanying demand to be able to identify and retrieve the data readily and review the material to allow a selection to be made of a portion of the stored material or the required part of the material to be identified. In order to allow the efficient retrieval of material, it is necessary to be able to accurately identify segments of the material at the time of storage so that for example, for video material, the frames of video can be identified, and the particular form of frame and coding method used can be identified with respect to each frame for subsequent retrieval and generation of a video display.

The use of the memory is at present complicated by the reception of broadcast program material that is transmitted in a scrambled or encrypted format to prevent unauthorized viewing of the same. The material can be descrambled by, for example, the payment of an appropriate sum to authorize the descrambling; however, it is desired that encrypted material should also be able to be stored in a memory and an identification database created. A known solution is to record the broadcast encrypted material, read it from the memory and then parse it to obtain the appropriate start identifier for the material. This solution has the benefit of not requiring the construction of a database of location identifiers but does have the disadvantage of requiring for retrieval that all of the material data has to be read from the memory at a high rate until the start identifier is located as this is the only reference identification.

SUMMARY OF THE INVENTION

The aim of the present invention is to provide apparatus and a method whereby the material stored in the memory is identified with respect to location identifiers held in a database to allow the retrieval of the material and in particular to allow material which may be in an encrypted form when received to be identified and stored while at the same time ensuring the security of the same in storage.

In a first aspect of the invention there is provided a system including a receiver for broadcast data having a means for identifying and storing broadcast program material in a memory means and allowing subsequent selected retrieval of material from the memory, characterized in that the method includes the steps of receiving the broadcast program material and, if the material is in an encrypted format, processing the material using some or all of the steps of data de-scrambling and/or data decrypting and/or data stream parsing to generate a number of location identifiers for respective portions of the material, which identifiers are held in a database for reference and upon selection of an identifier or identifiers, retrieval of a respective portion or portions of material from the memory means.

Thus, the system allows for the identification and storage of encrypted broadcast program material in a memory means and subsequent selected retrieval of the material from the memory, with the method typically including the steps of receiving the broadcast program material and, if the material is an encrypted format, processing the same, typically using the steps of descrambling or decrypting and stream parsing to be able to generate a number of location identifiers for the material that are held in a database for reference in the retrieval of the memory from the memory means. Typically, the material which is referred to in this specification is digital data which can be any of video, audio and or auxiliary data and which, after reception at the broadcast data receiver, can be decoded, and if necessary reordered and combined to generate for viewing or listening identifiable programs, teletext, Electronic Program Guides or the like.

In a preferred embodiment, the encrypted material undergoes a further processing step of copy protection so that when the material is stored in the memory, it is protected against unauthorized copying which is, of course, one of the reasons for the initial encrypting of the data. The material is held in a secure state in the memory but can be identified and retrieved.

Preferably the processing steps for the encrypted material should be performed as one process so as to prevent unauthorized access to the material when in a descrambled form.

If the broadcast program material is not encrypted, the same is received and identified for storage in the memory but need not pass through at least the processing steps of descrambling and copy protection.

In one embodiment the database of location identifiers which is generated in relation to the encrypted material may also be encrypted to ensure security of the material.

In a further aspect of the invention there is provided a method of generating a database index of the location of specified features of video and/or audio data material relating to a broadcast program held in a memory device. The material is received by a broadcast data receiver from a remote location in an encrypted form. The method comprises the steps of decrypting the data, parsing the data to generate a plurality of location identifiers for respective portions of the material, and storing the location identifiers in a database, and locally encrypting the material prior to storage in the memory device.

In one feature of the invention, the memory device and processor means for performing the method described above are located in a data receiver that receives the broadcast program material from a remote source. Typically, the program material received is transmitted in an encoded digital format and the receiver includes means for decoding the received data and generating video and/or audio displays via a television set or monitor and speakers in connection with the data receiver.

In a yet further aspect of the invention there is provided a broadcast data receiver provided for the reception of broadcast digital data from a remote location, the decoding of the data and generation of video, audio and/or auxiliary data for viewing and/or listening via a display screen and/or speakers to which the receiver is connected, said broadcast data receiver provided with or connected to a memory means for the storage of video, audio and/or auxiliary material generated from the received data for selective access at a subsequent time and wherein if said data is received in an unencrypted form, the data is decoded and stored in the memory means in conjunction with a record of the location identifier for said material to allow subsequent retrieval and if the data is received in an encrypted form the data is decrypted, parsed to generate a plurality of location identifiers for respective portions of the data material, and stored, with the said location identifiers held in a database, and the material is locally encrypted to storage in the memory device.

By allowing for the local encryption of the material, the material can be stored securely at the broadcast data receiver, or in associated apparatus, and still be retrieved at a later time for viewing if the viewer is authorized for the decryption of the material.

BRIEF DESCRIPTION OF THE DRAWINGS

A specific embodiment of the invention is now described with reference to the accompanying drawing which illustrates a schematic illustration of the system in one embodiment.

DETAILED DESCRIPTION OF THE PREFERRED EMBODIMENTS

Figure 1:
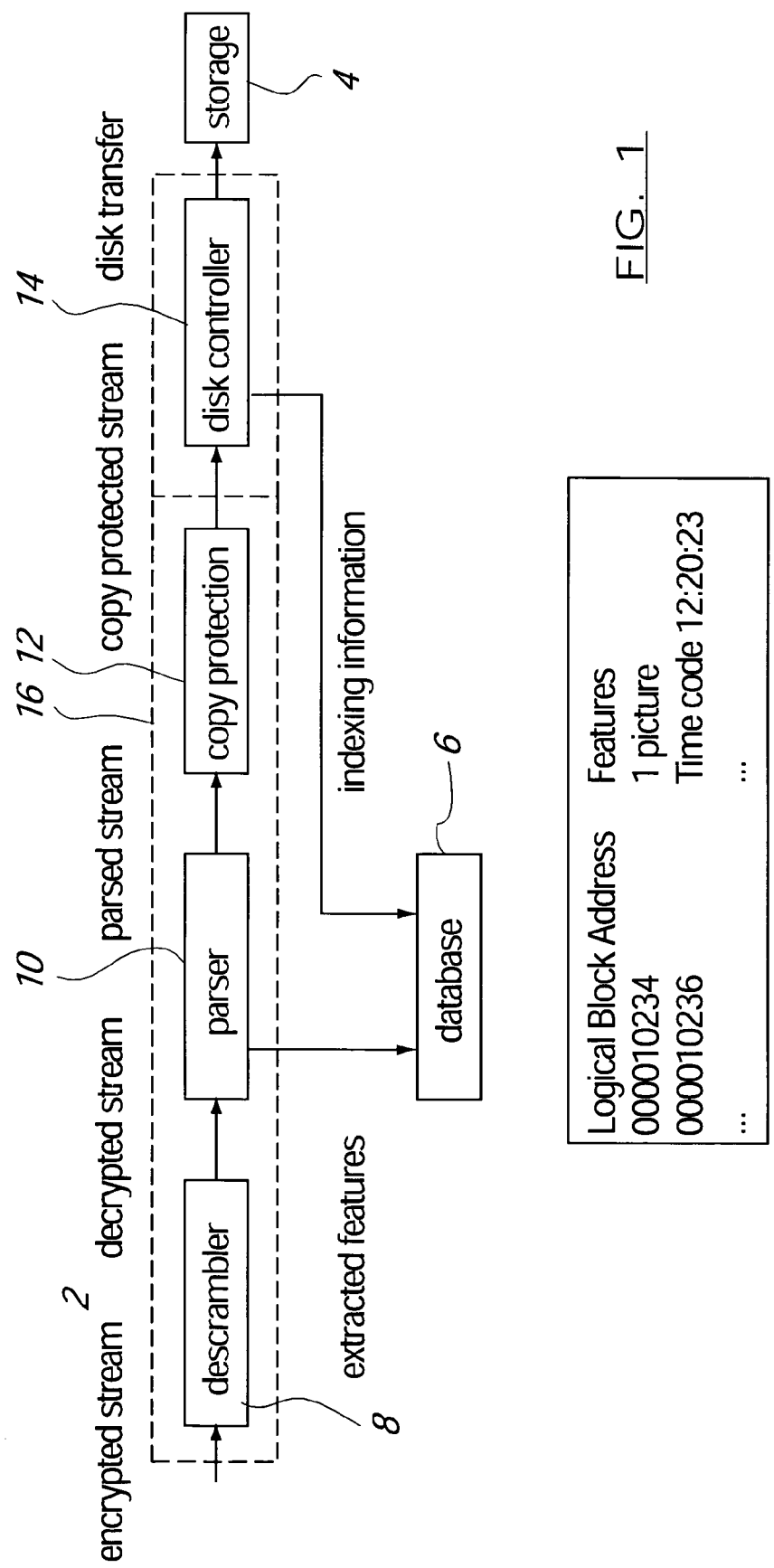

In an example, it is desired to store received data material arriving in an encrypted stream 2 relating to a broadcast program, in a memory in the form of a hard disk drive for subsequent retrieval. The said retrieval may be for all of the material, portions or excerpts of the same and/or it may be required to fast-forward or rewind, pause or perform other search functions on the material in storage.

In one embodiment the memory is provided as part of a broadcast data receiver which includes components to allow the reception of digital data broadcast from a remote location via, satellite, cable or terrestrial systems, the decoding of the data and the generation of a video, audio or auxiliary data for display via, for example a television set. The broadcast data receiver can be provided connected to the television set or as an integral part thereof and equally the memory can be provided as an integral part of the broadcast data receiver, the television set, or can be connected to one or the other.

At certain or all instances the received data can be received in an encrypted form and a database 6 is provided for the memory which allows the storage of location identifiers for the material which are generated before the material is input or recorded onto memory 4.

Thus in accordance with the invention, the received encrypted material 2 is first descrambled or decrypted 8 and then parsed 10 to allow the decision and generation of location identifiers sent to the database 6, which may be in absolute terms or relative to other identifiers, for features in the material data. Some examples of useful features can be, for video material, the start of I, B or P frames, Group Of Picture (GOP) sequences, time codes and/or pictorial temporal references.

Once the location identifiers are generated and stored in the database, the material can then be re-encrypted for copy protection 12 prior to the storage of the same in the memory. A memory or disk controller 14 is utilized to generate indexing information for the memory that is stored in the database and allocated against the location identifier for the respective portions of material so that the same can subsequently be found in the memory 4.

Subsequently, when the instant arrives at which some or all of the encrypted material is to be retrieved from the memory, reference to the database 6 can be made to accurately identify and start the supply of the material from the memory from the most relevant or convenient location identifier for the material in response to the retrieval demand. For example if a particular excerpt or portion of the material is to be retrieved, the supply of material could start from the "I frame with a time code nearest a particular time". The material supply is commenced by parsing the database to find the best matched location identifier in the form of a time code and then reference is made to the database index for that material to identify and access the sector of the disk drive memory where the material is held.

As suggested previously, it is of advantage for security reasons to have the decryption, parsing and copy protection integrated as one process to form a material processor. The accompanying Figure illustrates in the shaded area 16 how this can be achieved and, thereby, prevents unauthorized access to the material when in the decrypted form. A further stage can be the integration of the memory controller 14 into the same unit as the material processor 16, and it allows simplified tracking of the storage sector used for the key features that are extracted and used to form the database.

In one further feature the database 6 information may be locally encrypted to provide another level of security.

The invention therefore provides a relatively fast, efficient access to stored material which can be stored in an encrypted, copy protection form and yet allows the location of the material to be identified with reference to a database index.

With the ability to store program material (video/audio etc) on hard-disk drives (and similar) it becomes desirable to have truly random access, fast-forward, rewind capabilities. To efficiently random access the stream, it is necessary to be able to physically locate say I, P, B or temporal tagged pictures. This invention relates to the construction of a database mapping particular picture properties to physically addressable units on the storage device. However, in a broadcast environment where the program.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element.

The invention claimed is:

1. A method of generating a database index of location identifiers of specified features of video, audio and/or auxiliary data material relating to a broadcast program held in a memory device, said data material for the program received by a broadcast data receiver from a remote location in an encrypted form, said broadcast data receiver connected to or integral with a television to allow the generation of the video, audio and/or auxiliary data, the method comprises the steps of:

decrypting the received data material after receipt by the broadcast data receiver;

parsing the data material to generate a plurality of location identifiers for respective portions of the data material;

storing said location identifiers in a database; and locally encrypting said data material prior to storage in said memory device and wherein the data material includes frames or pictures of video and the location identifiers generated refer to features of the video data material selected from the group consisting of: a specified frame of video a group of picture sequence, a time code, and a pictorial temporal reference in order to identify a particular portion of the data material stored in said memory device.

2. A method according to claim 1 wherein the memory device and a processing apparatus for performing the method are located in said broadcast data receiver.

3. A method according to claim 2 wherein the data material for the program received is in an encoded digital format and said broadcast data receiver includes a system for decoding the received data material, including the step of generating an audio display via a speaker or speakers.

4. A method according to claim 1 in which said step of processing said data material to generate a number of location identifiers includes de-scrambling the data material.

5. A method according to claim 1 in which said step of processing said data material to generate a number of location identifiers includes decrypting the data material.

6. A method according to claim 1 in which said step of processing said data material to generate a number of location identifiers includes data stream parsing the data material.

\* \* \* \* \*